(12) United States Patent
Ramies

(10) Patent No.: US 11,402,034 B2
(45) Date of Patent: Aug. 2, 2022

(54) UNDERGROUND STORAGE TANK DROP TUBE REMOVAL DEVICE AND METHOD OF REMOVING AN UNDERGROUND STORAGE TANK DROP TUBE

(71) Applicant: Ron Ramies Automotive Inc., Portola Valley, CA (US)

(72) Inventor: Ronald M. Ramies, Portola Valley, CA (US)

( * ) Notice: Subject to any disclaimer, the term of this patent is extended or adjusted under 35 U.S.C. 154(b) by 448 days.

(21) Appl. No.: 16/575,756

(22) Filed: Sep. 19, 2019

(65) Prior Publication Data
US 2021/0088156 A1     Mar. 25, 2021

(51) Int. Cl.
| | |
|---|---|
| B23P 19/00 | (2006.01) |
| F16L 1/06 | (2006.01) |
| F16L 1/028 | (2006.01) |
| B65D 90/00 | (2006.01) |
| B65D 88/54 | (2006.01) |
| B25B 27/00 | (2006.01) |

(52) U.S. Cl.
CPC .................. *F16L 1/06* (2013.01); *B23P 19/00* (2013.01); *B25B 27/00* (2013.01); *B65D 88/54* (2013.01); *B65D 90/00* (2013.01); *F16L 1/028* (2013.01); *B65D 2588/545* (2013.01)

(58) Field of Classification Search
CPC ...... B25B 27/00; B25B 27/0042; B25B 27/14
See application file for complete search history.

(56) References Cited

U.S. PATENT DOCUMENTS

| | | | | |
|---|---|---|---|---|
| 1,529,075 A | * | 3/1925 | McIntyre | ................ B25B 13/04 |
| | | | | 81/124.3 |
| 1,593,947 A | * | 7/1926 | Miller | ....................... B67B 7/18 |
| | | | | 81/3.4 |
| D130,756 S | * | 12/1941 | Howard | ............................ 7/138 |

(Continued)

OTHER PUBLICATIONS

NJDEP Hazardous Waste/UST Compliance & Enforcement underground storage tank inspection program, downloaded from https://www.state.nj.us/dep/enforcement/ust-compliance-info-pdfs.html.

(Continued)

*Primary Examiner* — Lee D Wilson
(74) *Attorney, Agent, or Firm* — Young Law Firm, P.C.

(57) ABSTRACT

A device for facilitating removal of a drop tube from an underground liquid storage tank, comprises a plate configured to fit within a spill restrictor fitted to the underground liquid storage tank. The plate may comprise a first main surface; a second main surface that is separated from the first main surface by a thickness of the plate, the second main surface being configured to rest on a bottom surface of the spill restrictor; a first truncated portion configured to clear any structure projecting from the bottom surface of the spill restrictor when the device rests on the bottom surface; a centrally-disposed opening configured to conform to and fit over a collar that is configured to attach to a riser pipe that rises from the underground liquid storage tank and to the drop tube; and at least one peripherally-disposed through hole traversing the thickness of the plate, the at least one peripherally-disposed through hole being configured to enable a elongate bar to be inserted therethrough and make contact with the bottom of the spill restrictor.

14 Claims, 8 Drawing Sheets

(56) References Cited

U.S. PATENT DOCUMENTS

| | | | | |
|---|---|---|---|---|
| 2,898,674 | A * | 8/1959 | Anderson | B25B 27/0035 7/169 |
| 3,745,860 | A * | 7/1973 | Bennett | B25B 13/04 81/124.4 |
| 3,760,657 | A * | 9/1973 | Muir | B67B 7/18 D8/18 |
| 3,929,042 | A * | 12/1975 | Blocker | F16K 27/08 7/138 |
| 4,262,560 | A * | 4/1981 | Hoffberger | B67B 3/2006 D8/40 |
| D268,473 | S * | 4/1983 | Rust | D8/17 |
| 4,414,865 | A * | 11/1983 | Brooks | B67B 7/18 D8/40 |
| 4,523,497 | A * | 6/1985 | Rosberg | B67B 7/18 81/3.44 |
| 4,633,740 | A * | 1/1987 | Jacobs | B67B 7/20 81/3.4 |
| D288,893 | S * | 3/1987 | Epstein | D8/19 |
| 4,770,069 | A * | 9/1988 | Mikan | B67B 7/18 81/3.55 |
| D311,313 | S * | 10/1990 | Whiteside | D8/27 |
| 5,042,331 | A * | 8/1991 | Allen | B67B 7/066 81/3.4 |
| 5,058,633 | A * | 10/1991 | Sharp | B65D 90/105 220/86.1 |
| 5,077,850 | A * | 1/1992 | Brubaker | B67B 7/44 224/163 |
| 5,167,172 | A * | 12/1992 | Heebner | B67B 7/182 81/3.2 |
| D360,117 | S * | 7/1995 | Mobile | D8/17 |
| 5,606,897 | A * | 3/1997 | Quinn | B25B 27/0042 206/349 |
| D416,178 | S * | 11/1999 | Moore | D8/16 |
| D434,622 | S * | 12/2000 | Jaynes | D8/17 |
| 6,449,824 | B1 | 9/2002 | Page, Jr. | |
| 6,553,870 | B1 * | 4/2003 | Kendall | B67B 7/18 81/3.39 |
| 6,655,418 | B1 * | 12/2003 | McGill | B65D 88/76 141/86 |
| 6,701,810 | B2 * | 3/2004 | Adamczyk | B25B 27/0042 81/176.15 |
| 7,069,815 | B1 * | 7/2006 | Yu | B67B 7/14 81/3.4 |
| 7,117,766 | B1 * | 10/2006 | Boehringer | B25B 13/5091 81/125 |
| 7,143,491 | B2 * | 12/2006 | Wood | B25B 27/04 81/3.27 |
| 7,152,505 | B2 * | 12/2006 | Chan | B67B 7/18 81/3.43 |
| 7,171,994 | B1 * | 2/2007 | O'Brien | B65D 90/10 141/311 A |
| 7,210,379 | B1 * | 5/2007 | Pepin | B25B 13/48 81/57.36 |
| 7,228,769 | B2 * | 6/2007 | Mendoza | B65D 71/50 206/141 |
| D576,851 | S * | 9/2008 | Zeyfang | D8/21 |
| 7,559,532 | B1 * | 7/2009 | Kodi | E04C 5/20 52/DIG. 1 |
| 7,707,912 | B1 * | 5/2010 | Sparks | B25B 27/0042 81/3.43 |
| 7,913,722 | B2 * | 3/2011 | Dorst | B63B 17/00 141/311 A |
| 8,082,821 | B2 * | 12/2011 | Wise | A63C 9/24 81/488 |
| 8,371,006 | B2 * | 2/2013 | Robledo | B25B 27/02 606/1 |
| D679,967 | S * | 4/2013 | Junyong | D8/17 |
| D689,351 | S * | 9/2013 | Webb, Jr. | D8/27 |
| 8,887,598 | B1 * | 11/2014 | Oakley | B67B 7/16 81/177.3 |
| 8,950,291 | B1 * | 2/2015 | Coleman | B67B 7/403 81/3.09 |
| 9,187,305 | B1 * | 11/2015 | Olt | B67B 7/16 |
| 9,487,318 | B1 * | 11/2016 | Catlin | B65B 61/18 |
| 10,285,392 | B2 * | 5/2019 | Thomas | A01K 97/06 |
| 10,322,836 | B2 * | 6/2019 | Catlin | B65B 61/20 |
| D891,087 | S * | 7/2020 | Morgan | D3/207 |
| 10,974,370 | B2 * | 4/2021 | Guillen | B25G 1/102 |
| 2003/0079568 | A1 * | 5/2003 | Cope | B67B 7/186 81/3.32 |
| 2004/0074341 | A1 * | 4/2004 | McLuen | B67B 7/066 81/3.44 |
| 2004/0163494 | A1 * | 8/2004 | Alexander | B67B 7/406 81/3.55 |
| 2005/0241723 | A1 | 11/2005 | Pendleton et al. | |
| 2006/0266160 | A1 * | 11/2006 | Yeh | B67B 7/44 81/3.4 |
| 2007/0000353 | A1 * | 1/2007 | Yu | B25B 27/0042 81/3.4 |
| 2011/0089071 | A1 * | 4/2011 | Kuehn | B65D 90/503 220/315 |
| 2011/0296956 | A1 * | 12/2011 | Sheu | B67B 7/406 81/3.57 |
| 2014/0097393 | A1 | 4/2014 | Green | |
| 2019/0056256 | A1 | 2/2019 | Markham et al. | |
| 2021/0088156 | A1 * | 3/2021 | Ramies | F16L 1/028 |

OTHER PUBLICATIONS

California Environmental Protection Agency Air Resources Board Vapor Recovery Test Procedure TP-201.1D, Amended Oct. 8, 2003, downloaded from https://ww3.arb.ca.gov/testmeth/vol2/tp201.1d_oct2003.pdf.

Petroleum Equipment Forum, Drop Tube, downloaded from https://forum.pei.org/viewtopic.php?f=16&t=50 on Sep. 19, 2019.

Petroleum Equipment Forum, Drop Tube, downloaded from https://forum.pei.org/viewtopic.php?f=7&t=9362 on Sep. 19, 2019.

UST Certified Contractor Common Issues Observed, downloaded from UST Certified Contractor Common Issues Observed on Sep. 19, 2019.

Operator Training Drop-Tube Shut-Off Valve South Carolina Department of Health and Environmental Control, downloaded from https://www.scdhec.gov/sites/default/files/docs/Apps/Environment/USTOperatorTraining/Content/Lessons/Drop%20Tube%20Shut%20Off.pdf on Sep. 19, 2019.

Tank Testing Nightmares as Chronicled by a Massachusetts Tank Company, downloaded from https://www.commtank.com/tank-articles/ust-tank-testing-companies.php on Sep. 19, 2019.

LinkedIn Post, How do you get stuck drop tubes out?, downloaded from https://www.linkedin.com/feed/update/urn:li:activity:6487103118495535104/ on Sep. 19, 2019.

\* cited by examiner

UNDERGROUND STORAGE TANK DROP TUBE REMOVAL DEVICE AND METHOD OF REMOVING AN UNDERGROUND STORAGE TANK DROP TUBE

BACKGROUND

Nearly all gasoline service stations store fuel in underground liquid storage tanks. These storage tanks are typically filled by large fuel delivery trucks and gradually emptied by dispensing pumps operated by the customer, via suitable fittings and pipes. To prevent spillage when the underground liquid storage tank is being filled, a spill restrictor may be provided, to catch and contain inadvertent fuel spillage. Typically, such spill restrictors are designed to contain spills up to about five gallons of fuel. The spill restrictor may have a spill restrictor cover to prevent vapors from the spilled fuel from outgassing into the environment.

As shown in FIG. 1, a riser pipe or manway 104 extends from the underground storage tank 102 to the spill restrictor 106 and is in fluid communication with the stored fuel in the underground liquid storage tank 102. A drop tube 108 may be co-axially-provided at the upper end of the riser pipe 104, leaving an interstitial space between the inner wall of the riser pipe 104 and the outer wall of the drop tube 108. Significantly, the riser pipe 104 may be secured to or integral with the underground liquid storage tank. The drop tube 108 may include a four-inch aluminum pipe, a float flapper to prevent over filling of the tank and may extend to within about six inches from the bottom of the underground liquid storage tank 102. In operation, the drop tube 108 reduces generation of chaotic air bubbles and fuel vapor in the fuel as the tank 102 is being filled. Indeed, instead of splashing into a nearly empty tank 102 from the top, fuel being delivered to the tank is routed through the drop tube 108 where it emerges, in a less turbulent manner, near the bottom of the tank.

Drop tubes are deemed crucial safety equipment and are routinely inspected, as are any installed overfill preventing devices. Drop tubes are secured to the riser pipe via mating threads on both the riser pipe and the drop tube via a collar. Dirt, sediment, galvanic corrosion, however, may all conspire to cause the drop tube to seize onto the riser pipe, making removal and inspection of the drop tube difficult. In fact, the drop tube is often destroyed by the inspectors in the process of removing it. Indeed, the drop tube may be damaged or destroyed during the inspection thereof, as inspectors attempt to unscrew the drop tube from the riser pipe. The cost of replacing a destroyed drop tube, while not negligible, is bearable—a few hundred dollars, not including the loss of income occasioned by not being able to refill the underground storage tank. However, when the drop tube and riser pipe are effectively cold-welded together or otherwise stubbornly stuck to one another, excessive torque may be applied to the drop tube without the drop tube coming loose, and the applied torque may be directly transmitted to the riser tube, which is secured to or integral with the underground liquid storage tank. When sufficient torque is applied, the whole drop tube and riser tube assembly may be sheared apart, leaving an unusable and mangled mess at the bottom of the spill restrictor. When this happens, the underground storage tank likely must be dug out and replaced at considerable and often prohibitive cost.

What are needed, therefore, are devices and methods to facilitate the removal of drop tubes from riser pipes of underground liquid storage tanks that reduce the likelihood of damaging both the riser pipe and the underground liquid storage tank itself.

DETAILED DESCRIPTION

Figure 1:
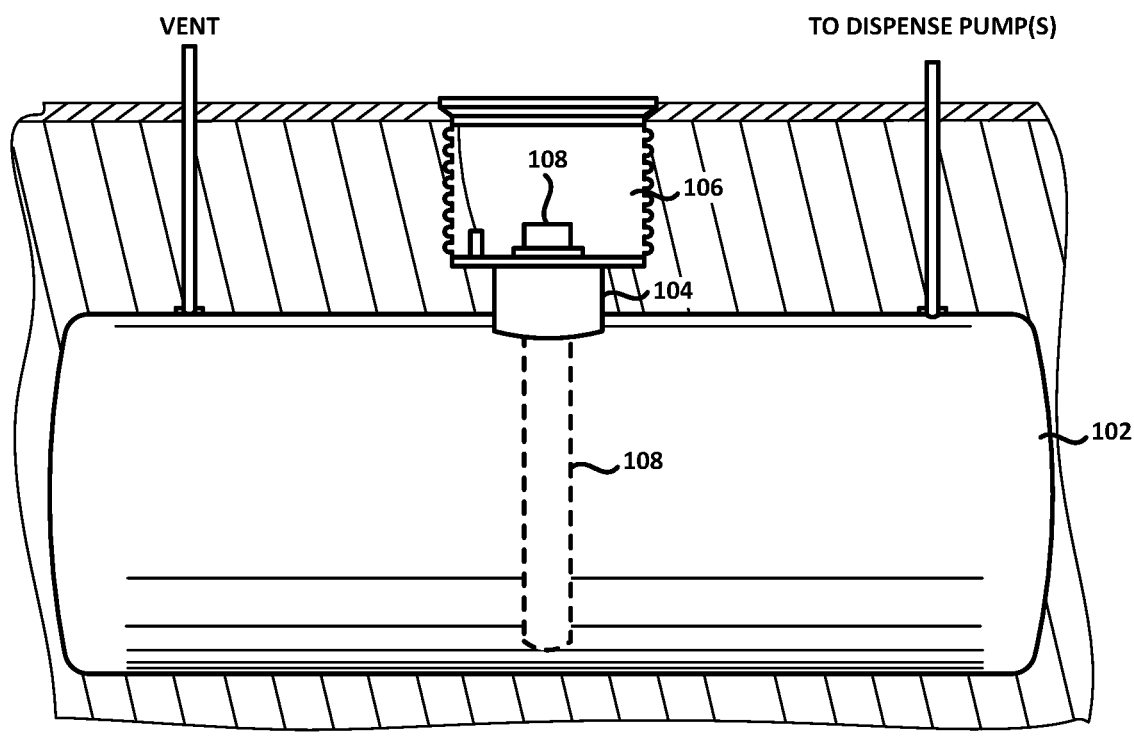
FIG. 1 is a diagram of an underground liquid storage tank.
Figure 2:
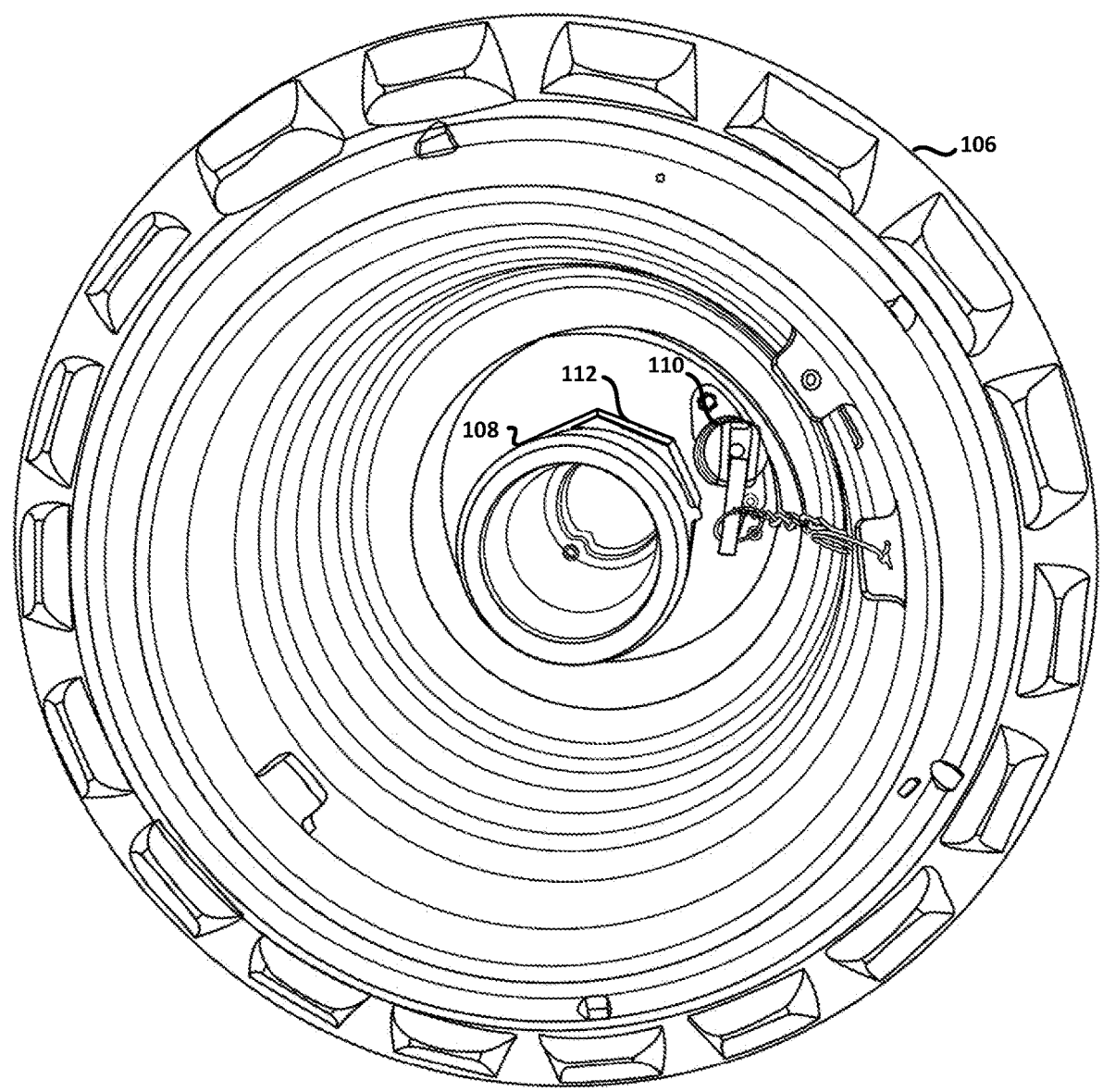
FIG. 2 is an overhead view of the spill restrictor, showing the collar and the drop tube.

FIG. 2 is an overhead view of a spill restrictor, showing the drop tube and the collar to which the riser pipe and the drop tube are attached. In FIG. 2, the cover of the spill restrictor has been removed, to enable the internal components to be visible. As shown, the spill restrictor 106 may be a double-walled generally cylindrical device, designed to be sunk into the ground, leaving only the top-most portion thereof and the spill restrictor cover at surface level, as suggested in FIG. 1. At the bottom of the spill restrictor 106 at an off-center position is a drain valve assembly 110, configured to drain excess fuel from the spill restrictor 106. As shown in FIG. 2, the drop tube 108 is secured to the collar 112 to which the riser pipe 104 is also attached. The collar 112 includes a bottom surface in contact with the bottom surface of the spill restrictor 106.

Figure 3:
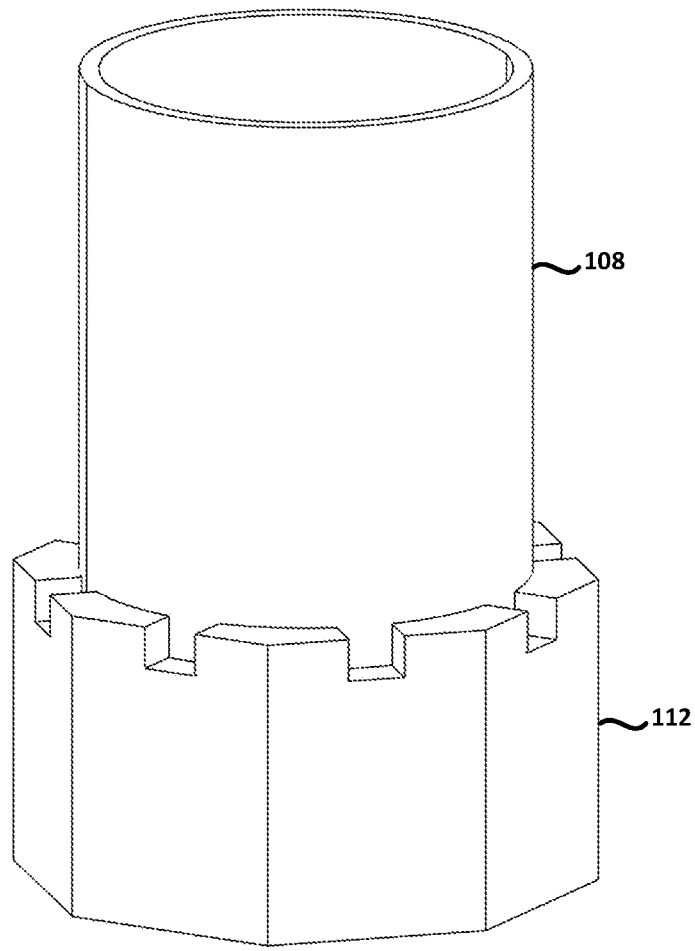
FIG. 3 is a partial perspective view of a drop tube attached to a collar that is located at the bottom of the spill restrictor and configured to mate the drop tube to the riser pipe.
Figure 4:
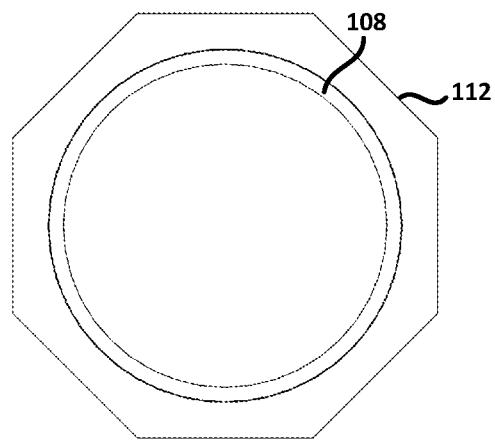
FIG. 4 is a bottom view of the collar of FIG. 3.

FIG. 3 shows an assembly comprising the collar 112 and a partial drop tube 108. FIG. 4 is a bottom view of the collar 112 and drop tube 108. In the implementation shown herein, the collar 112 is a generally hexagonal cylinder, although other implementations are possible. As also shown in FIG. 3, the top surface of the collar 112 may include crenellations, to reduce the surface area thereof in contact with the drop tube 108. Although not shown in FIG. 3, an interior surface of the collar 112 may define threads, enabling matching threads on the drop tube 108 to engage therewith and secure the drop tube 108 to the collar 112. In turn, the collar 112 may attach to a top portion of the riser pipe 104, also by matching threads.

Figure 5:
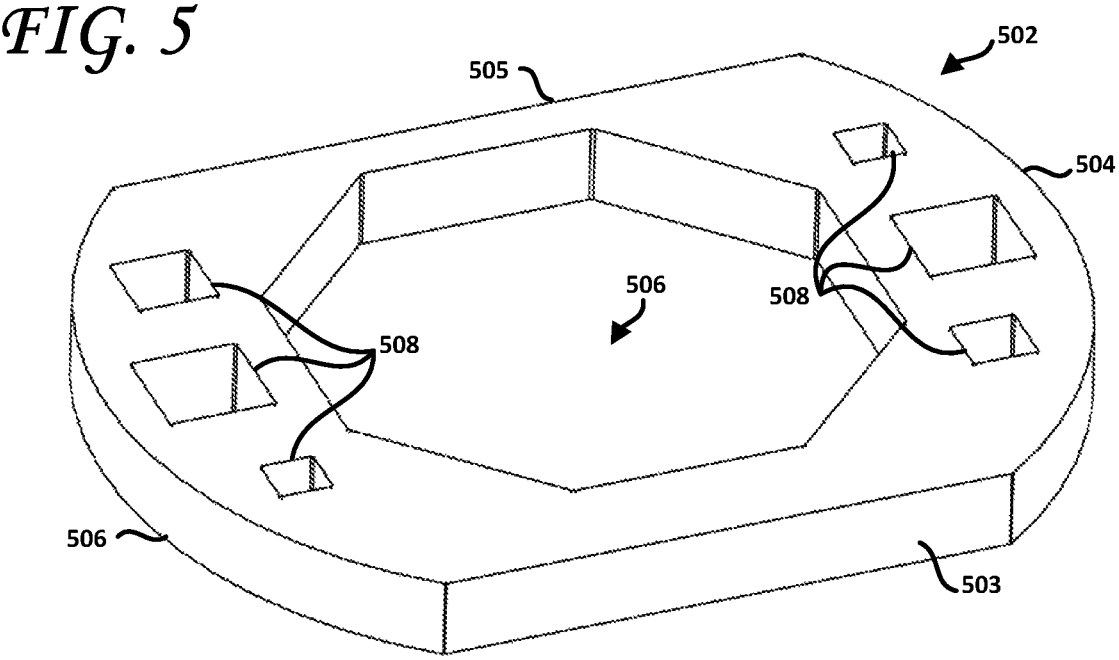
FIG. 5 is a perspective view of a drop tube removal tool, according to one embodiment.
Figure 6:
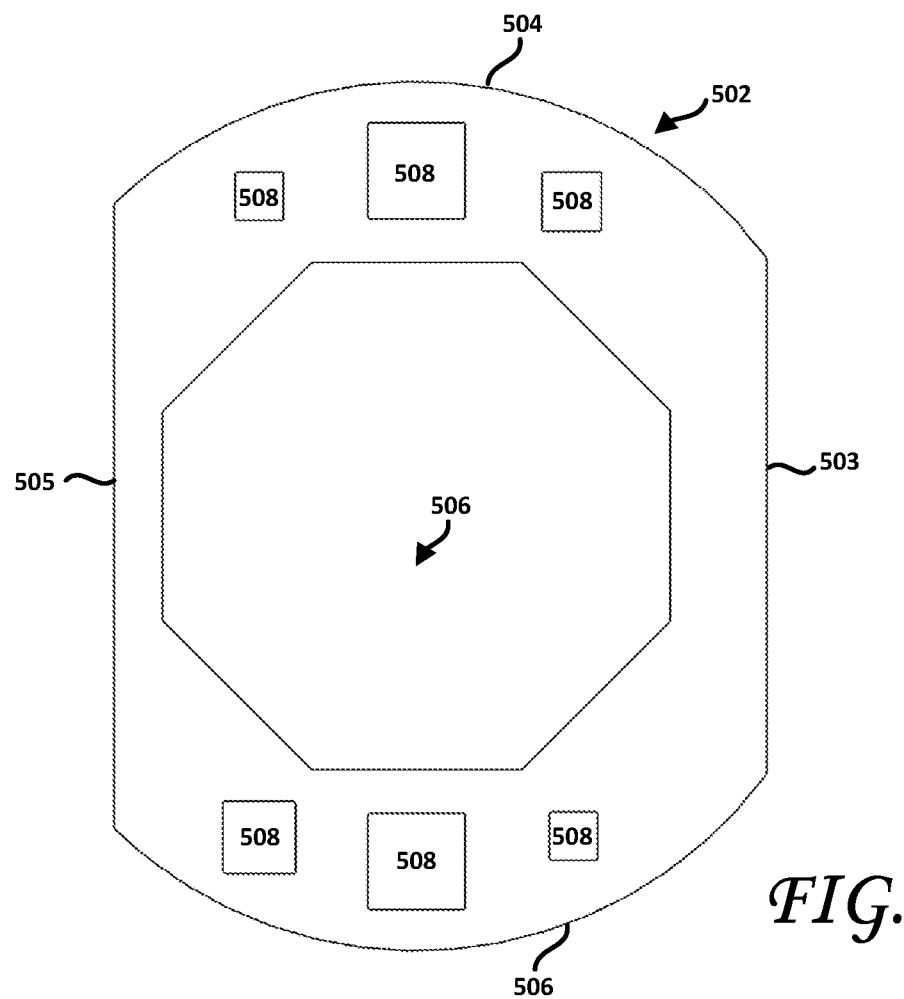
FIG. 6 is a top view of the drop tube removal tool of FIG. 5.

FIG. 5 is a perspective view of a drop tube removal tool 502, according to one embodiment and FIG. 6 is a top view of the drop tube removal tool 502 of FIG. 5. As shown therein, the drop tube removal tool 502, according to an embodiment, may be formed from a thick plate of metal such as iron or stainless steel. For example, the drop tube removal tube may be more than one inch thick and weigh, for example, 5-10 lbs., although none of the exemplary dimensions disclosed herein are limiting in nature, as the present drop tube removal tool may be differently dimensioned and shaped according to different spill restrictor configurations. Moreover, the present drop tube removal tool may be formed of a material other than iron or steel. As shown in FIGS. 5 and 6, the drop tube removal tool 502 may be configured, according to one embodiment, as a truncated circular plate with various through holes formed therein. The circular plate from which the drop tube removal tube 502 is formed may be dimensioned so as to fit within the spill restrictor 106 and to rest on the bottom surface thereof, at least partially conforming to the circular shape of the bottom surface of the spill restrictor 106. According to one embodiment, the drop tube removal tool 502 may include one or more truncated portions, as shown at 503 and 505. Unlike the non-truncated curved surfaces 504 and 506, the truncated portions 503, 505 may define, according to one embodiment, straight, rectangular-shaped surfaces. A centrally-disposed opening 506 may be provided. The centrally-disposed opening 506 may be configured to fit over the collar 112, in intimate contact therewith. Indeed, the interior walls of the central opening 506 of the present drop tube removal tool 502 may be configured to conform to the exterior side walls of the collar 112 and dimensioned so to facilitate manual emplacement and removal of the drop tube removal tool 502 onto and from the collar 112, without allowing too much play between the facing surfaces. In the implementation shown in the figures, the collar 112 has an hexagonal shape. Therefore, in such an implementation the centrally-disposed opening may be defined by internal surfaces that extend the width of the tool and collectively delineate a matching hexagonal shape, so as to fit snuggly onto and around the collar 112. In other implementations and other applications, the collar 112 may define a shape other than a hexagon and the central opening 506 of the present drop tube removal tube 502 may define a matching shape.

As shown in both FIGS. 5 and 6, the straight, rectangular surfaces of the truncated portions 503, 505 may be parallel to each other, although that need not be the case. As also shown in FIGS. 5 and 6, the present drop tube removal tube 502 may further comprise a plurality of through-holes 508 whose functionality is detailed hereunder.

Figure 7:
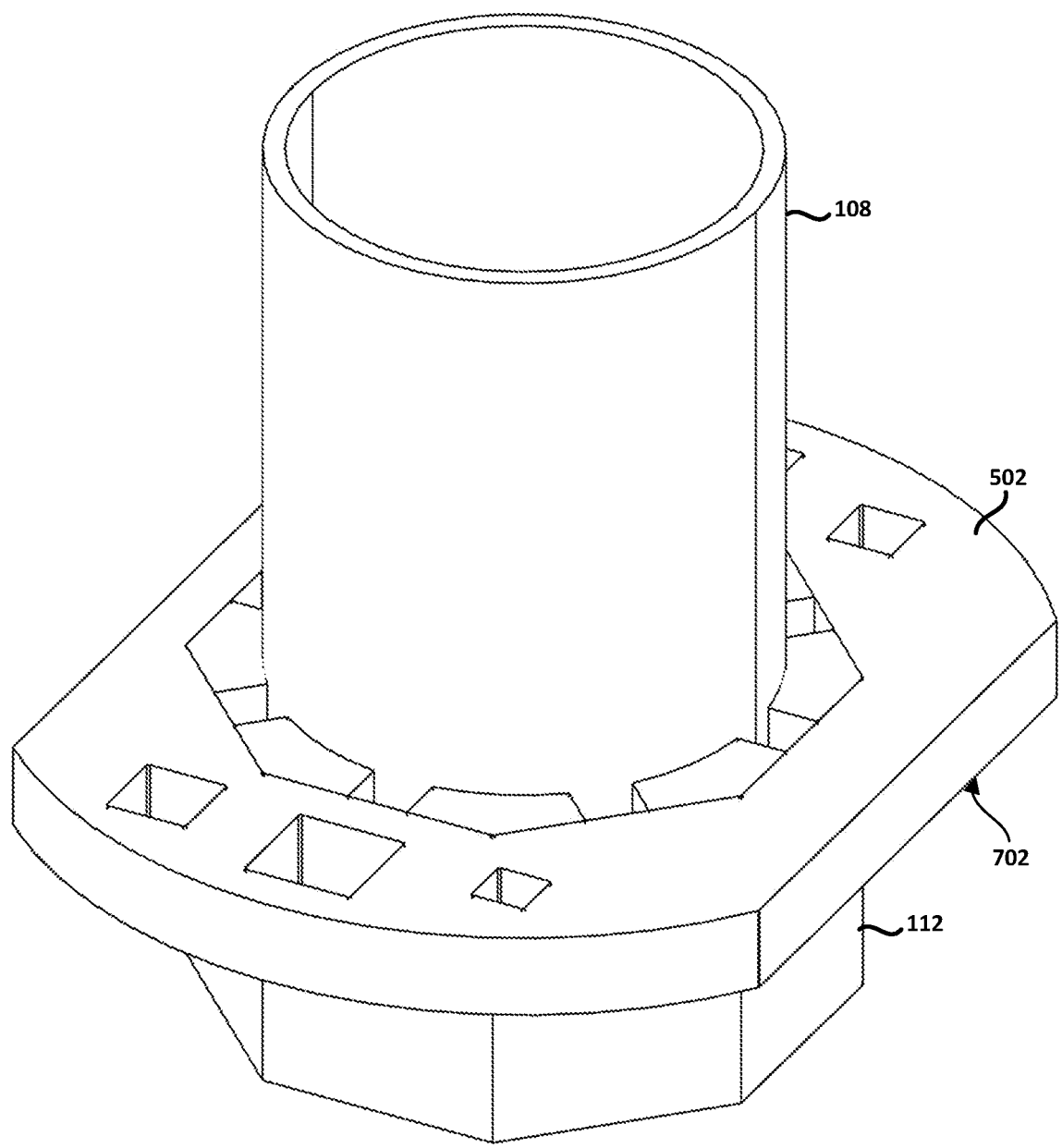
FIG. 7 is a partial perspective view of a drop tube attached to a collar over which a drop tube removal tube is fitted, according to one embodiment.

FIG. 7 is a partial perspective view of a drop tube 108 attached to a collar 112 over which a drop tube removal tube 502 is fitted, according to one embodiment. As shown, the centrally-disposed opening 506 of the drop tube removal tool 502 is fitted over the collar 112, with the constituent inner rectilinear inner surfaces of the centrally-disposed opening 506 facing corresponding ones of the rectilinear outer surfaces of the collar 112 with little interstitial spaces therebetween.

Figure 8:
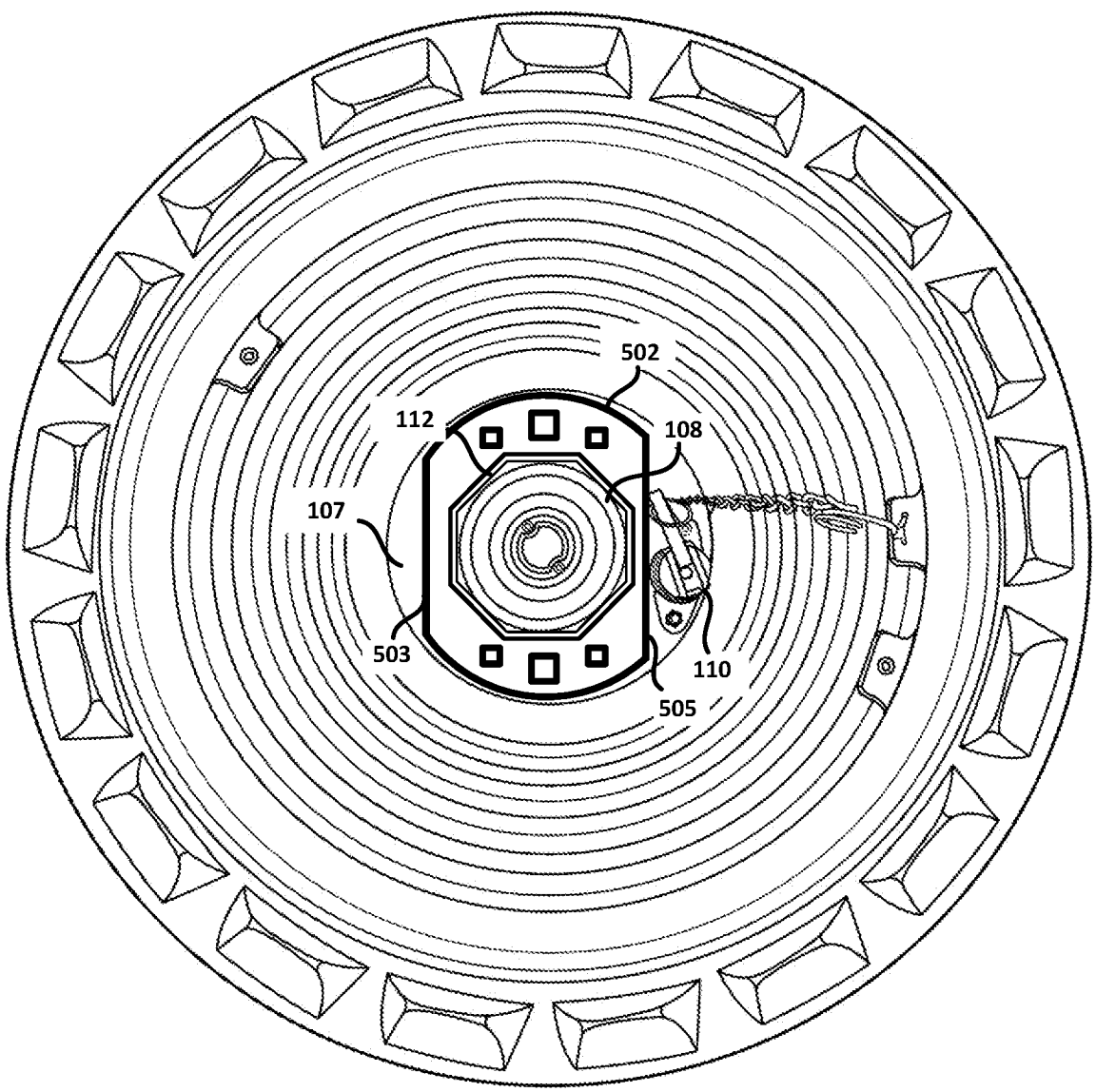
FIG. 8 is an overhead view of the spill restrictor, showing the drop tube and the drop tube removal tube fitted to the collar, according to one embodiment.

FIG. 8 is an overhead view of the spill restrictor 106, showing the drop tube 108 and the drop tube removal tool 502 (shown in thicker lines for ease of reference) fitted onto and over the collar 112, according to one embodiment. In use, the underside (not shown in FIG. 7 but suggested at 702 in FIG. 7) of the drop tube removal tool 502, when the drop tube removal tube is fitted onto the collar 112, rests on the bottom surface 107 of the spill restrictor 106. As shown in FIG. 8, the truncated portion 505 faces the drain valve assembly 110. In another configuration, the placement and size of the drain valve assembly 110 at the bottom surface 107 of the spill restrictor 106 may have allowed the truncated portion 503 to face the drain valve assembly 110, instead of the truncated portion 505. In any event, the drop tube removal tube 502 may include one or more such truncated portions to enable emplacement of the tool while avoiding projecting structures within the spill restrictor 106. As shown, the curved side surfaces (identified at reference numerals 504 and 506 in FIG. 5) of the drop tube removal tube 502 conform generally to the curvature of the inner walls of the spill restrictor 106. The though holes disposed near the outer periphery of the drop tube removal tube (shown at 508 in FIGS. 5 and 6) traverse the width of the drop tube removal tube, to enable the bottom surface 107 of the spill restrictor 106 to be seen therethrough.

Figure 9:
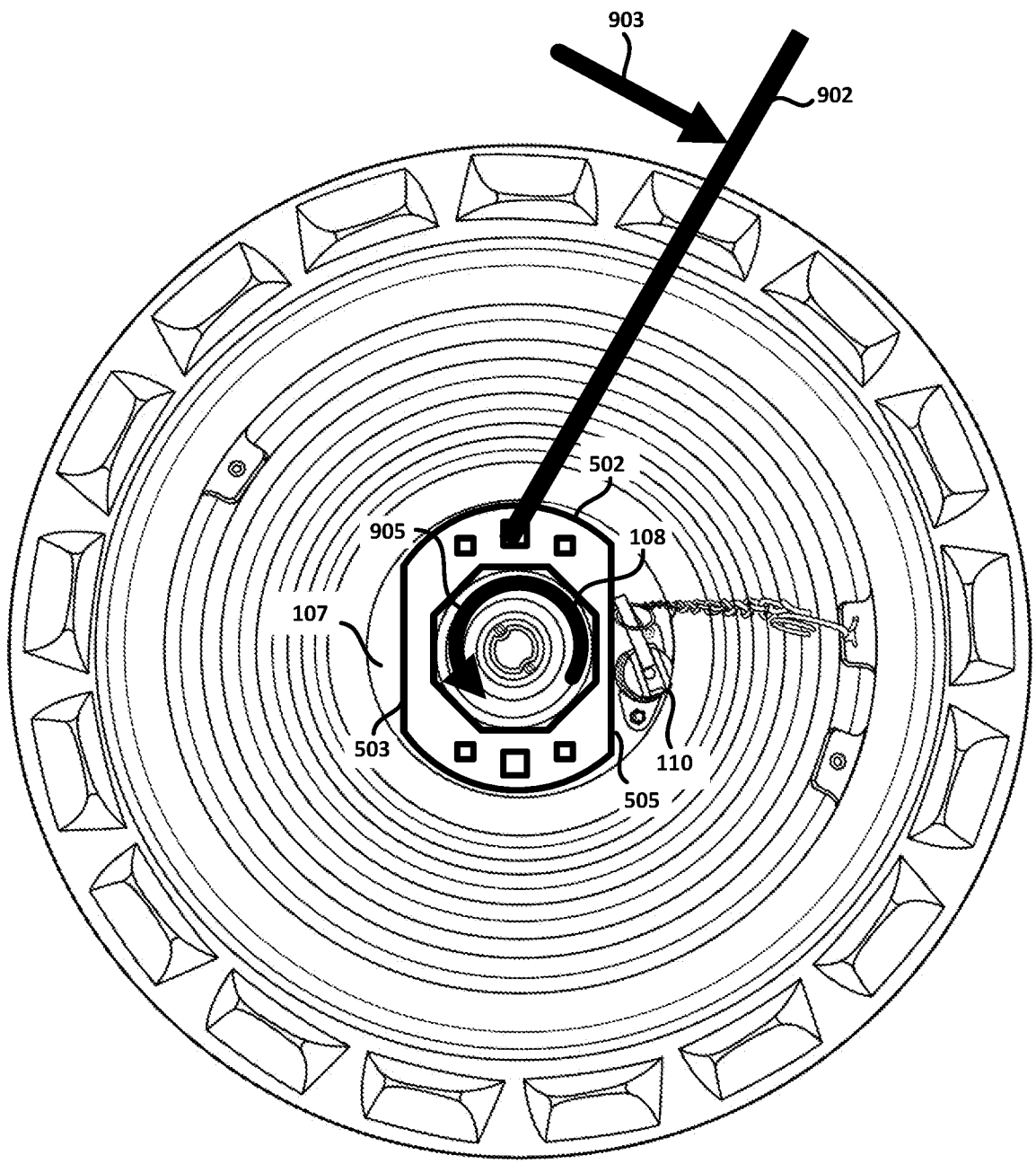
FIG. 9 illustrates aspects of a method of removing a drop tube from an underground liquid storage tank, according to one embodiment.

FIG. 9 illustrates aspects of a method of removing a drop tube from an underground liquid storage tank, according to one embodiment. FIG. 9 is identical to FIG. 8, but for the bar 902 and an indication of the forces imposed upon the system during the removal of the drop tube 108. As shown, a bar 902 may be inserted into one of the peripheral through holes 508 such that a distal end thereof contacts the bottom surface 107 of the spill restrictor 106. The proximal end of the bar 902 may, in one implementation, emerge from the spill restrictor 106 to enable a person to grasp it and exert a force thereon that counters the opposite twisting force 905 imparted on the drop tube 108 during removal thereof. In this manner, the bar 902 exerts both a downward-directed force against the bottom surface 107 of the spill restrictor 106 and a sideways-directed force (e.g., clockwise) that is opposite in direction from the (e.g., clockwise) direction in which the drop tube 108 is being unscrewed. In so doing, the drop tube removal tube 502 prevents at least a portion of the torque applied to the drop tube 108 from being transmitted to the riser pipe and/or any other underlying structure of the underground liquid storage tank. Consequently, the drop tube removal tool 502 provides a stable support to enable the drop tube 108 to be safely removed, without compromising the riser pipe and the underground liquid storage tank in general.

The bar 902 may be a sturdy pipe of a suitable diameter, a crow bar or most any elongate member whose distal end fits into one or more of the through holes 508. Indeed, a bar 902 may be devised whose distal end terminates into two or three separate projections, each fitting in one of the through holes 508 on one side of the drop tube removal tool 502, with the aim of increasing the friction of the drop tube removal tube 502 against the bottom surface 107 of the spill restrictor 106.

In this manner, even if the drop tube is stubbornly attached to the riser pipe, the drop tube may be safely removed therefrom, even if the removal thereof results in the destruction of the drop tube. In such a scenario, it is likely that the riser pipe would suffer no damage, as it is being held fast by the drop tube removal tool 502, which effectively isolates the forces applied to the drop tube 108 to only the drop tube 108.

Figure 10:
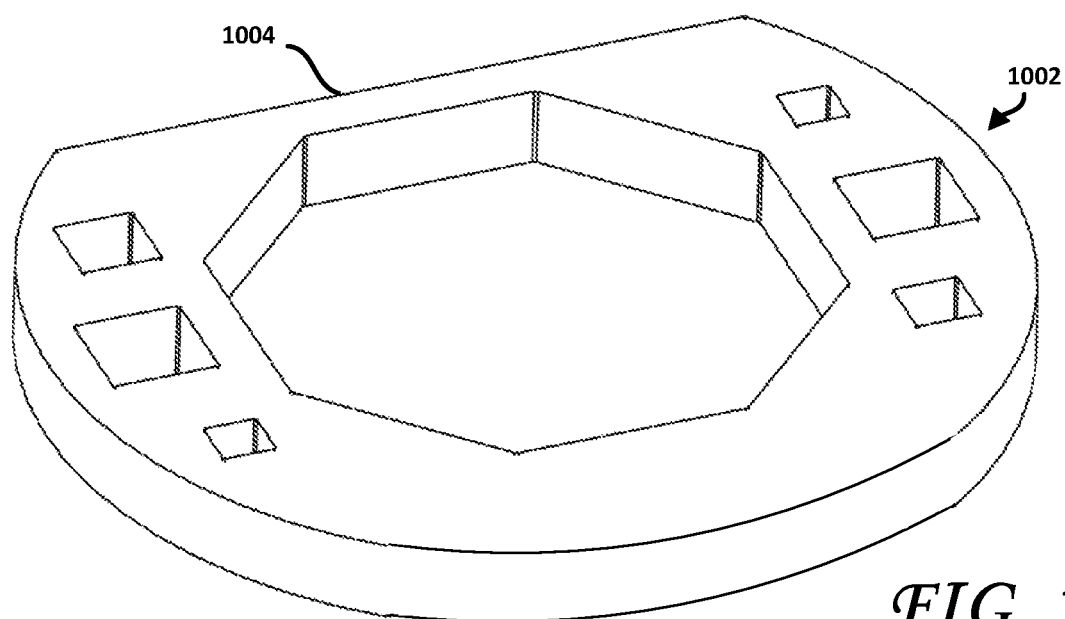
FIG. 10 is a perspective view of a drop tube removal tool, according to one embodiment.
Figure 11:
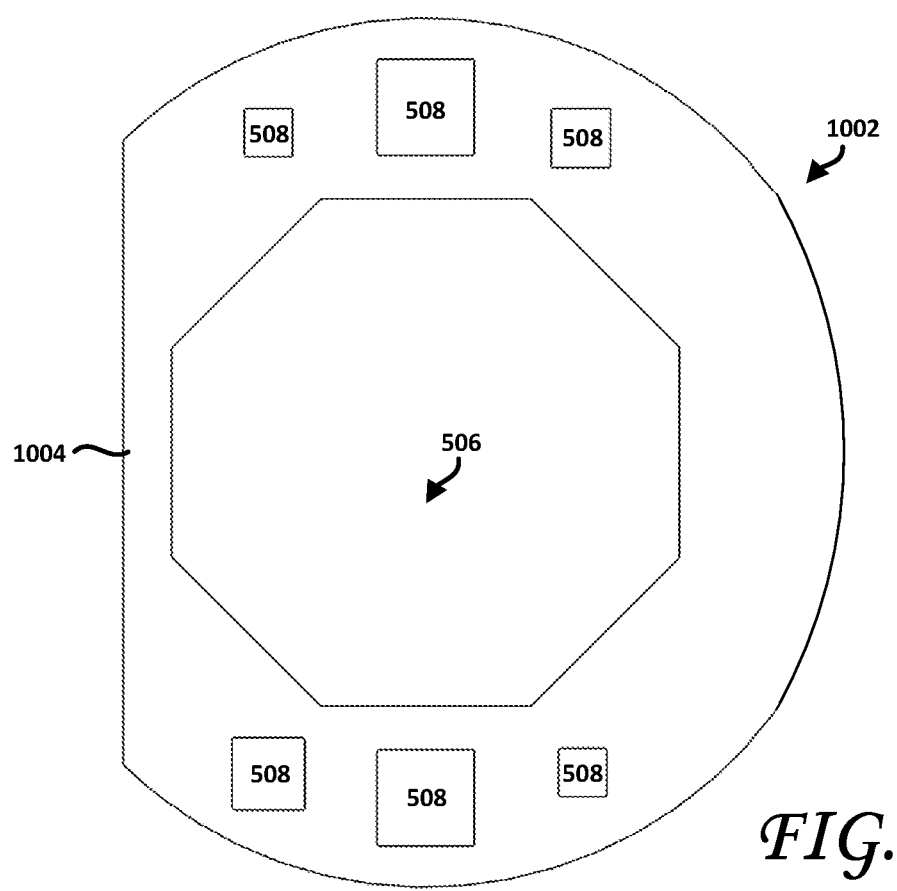
FIG. 11 is a top view of the drop tube removal tool of FIG. 10.

FIG. 10 is a perspective view of a drop tube removal tool, according to one embodiment. FIG. 11 is a top view of the drop tube removal tool of FIG. 10 As shown, the drop tube removal tube 1002 may include only a single truncated region, as shown at 1004. Moreover, in application where there are no projections such as the spill valve assembly 110, the tool 1002 may not feature any such truncated portions. In yet other implementations, the truncated portions may be shaped so as to avoid specific projections and structures within the spill restrictor, as the need may arise. While the peripherally-disposed through holes 508 are shown as being square or rectangular in shape, they need not be so. Indeed, the through holes 508 may be, for example, circular in shape or may be formed in any other shape desired—to accommodate a particularly-shaped distal end of the bar 902, for example. Thus, embodiments of the present drop tube removal tool are not limited to the specific implementations shown in the figures.

One embodiment, therefore, is a device for facilitating removal of a drop tube from an underground liquid storage tank. According to one embodiment, the device may comprise a plate configured to fit within a spill restrictor fitted to the underground liquid storage tank. The plate may comprise a first main surface; a second main surface that is separated from the first main surface by the thickness of the plate, the second main surface being configured to rest on the bottom surface of the spill restrictor; a first truncated portion configured to clear any structure projecting from the bottom surface of the spill restrictor when the device rests on the bottom surface; a centrally-disposed opening configured to conform and fit over a collar that is configured to attach to the drop tube and to a riser pipe that rises from the underground liquid storage tank; and at least one peripherally-disposed (the through holes need not be peripherally-disposed) through hole traversing the thickness of the plate, the peripherally-disposed through hole(s) being configured to enable a elongate bar to be inserted therethrough and make contact with the bottom surface of the spill restrictor.

According to further embodiments, the centrally-disposed opening may be shaped as a hexagon. The first truncated portion may define a rectilinear rectangular surface. The plate may further comprise a second truncated portion opposite the first truncated portion. At least one side surface of the plate other than the first truncated portion may be curved. The curved side surface(s) may have a curvature that matches or at least accommodates the curvature of the interior surface of the spill restrictor. The plate may further comprise one or more (peripherally, for example) disposed through holes. One or more of the peripherally-disposed through hole(s) may be rectangular or square in shape (for example) and the plate may comprise or be formed of metal.

Another embodiment is a method of removing a drop tube from an underground liquid storage tank, comprising providing a device comprising a plate configured to fit within a spill restrictor fitted to the underground liquid storage tank, the plate comprising a first main surface, a second main surface that is separated from the first main surface by the thickness of the plate, the second main surface being configured to rest on the bottom surface of the spill restrictor, a first truncated portion being configured to clear any structure projecting from the bottom surface of the spill restrictor when the device rests on the bottom surface, one or more peripherally-disposed, for example, through hole traversing the thickness of the plate, and a centrally-disposed opening configured to conform to and fit over a collar to which the drop tube and a riser pipe coupled to the underground liquid storage tank are screwed. Thereafter, a distal end of an elongate bar may be inserted through one or more of the peripherally-disposed through holes and may make contact with the bottom of the spill restrictor therethrough. Using the elongate bar inserted through the peripherally-disposed through hole(s), a first force directed in a first direction (e.g., clockwise) may be imparted onto the device. The drop tube may then be unscrewed from the collar by imparting thereon a second force that is directed in an opposite direction from the first force (e.g., counterclockwise), while the first force maintains the collar substantially immobile, thereby preventing damage to the riser pipe during removal of the drop tube.

According to further embodiments, the method may be carried out with the centrally-disposed opening being shaped as a hexagon. The providing step may be carried out with the first truncated portion defining a rectilinear rectangular surface. In one embodiment, the providing step may be carried out with the plate further comprising a second truncated portion opposite the first truncated portion. Providing may also be carried out with at least one side surface of the plate other than the first truncated portion being curved. Also, providing may be carried out with the curved side surface(s) having a curvature that matches a curvature of the interior surface (i.e., sidewalls) of the spill restrictor. In one embodiment, the providing step may be carried out with the plate further comprising one or more peripherally-disposed (for example) through holes. In one embodiment, one or more of these through holes may be of a different size or shape than remaining ones of the plurality of peripherally-disposed through holes. One or more peripherally-disposed through hole may be rectangular or square in shape, for example, although other shapes are possible. The plate may comprise or may be made of metal, for example.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A device for facilitating removal of a drop tube from an underground liquid storage tank, the device comprising a plate configured to fit within a spill restrictor fitted to the underground liquid storage tank, the plate comprising:
   a first main surface having a truncated circular shape;
   a second main surface having the truncated circular shape and that is separated from the first main surface by a thickness of the plate, the second main surface being shaped to rest on a bottom surface of the spill restrictor;
   a first truncated portion configured to clear any structure projecting from the bottom surface of the spill restrictor when the device rests on the bottom surface;
   a centrally-disposed opening configured to conform and fit over a collar that is configured to attach to the drop tube and to a riser pipe that rises from the underground liquid storage tank;
   a second truncated portion disposed opposite the first truncated portion and separated from the first truncated portion by the centrally-disposed opening such that outside edges of each of the first and second truncated portions are parallel to each other and such that remaining opposing outside edges of the plate are curved; and a plurality of peripherally-disposed through holes traversing the thickness of the plate, the at least one peripherally-disposed through hole being configured to enable an elongate bar to be inserted therethrough and make contact with the bottom surface of the spill restrictor.

2. The device of claim 1, wherein the centrally-disposed opening is shaped as a hexagon.

3. The device of claim 1, wherein at least one of the first truncated portion and second truncated portion defines a rectilinear rectangular surface.

4. The device of claim 1, wherein the remaining opposing outside edges of the plate have a curvature that matches a curvature of an interior surface of the spill restrictor.

5. The device of claim 1, wherein at least one of the plurality of peripherally-disposed through holes is of a different size or shape than remaining ones of the plurality of peripherally-disposed through holes.

6. The device of claim 1, wherein at least one of the peripherally-disposed through hole is rectangular or square in shape.

7. The device of claim 1, wherein the plate comprises metal.

8. A method of removing a drop tube from an underground liquid storage tank, comprising:

providing a device comprising a plate configured to fit within a spill restrictor fitted to the underground liquid storage tank, the plate comprising a first main surface having a truncated circular shape, a second main surface having the truncated circular shape and that is separated from the first main surface by a thickness of the plate, the second main surface being configured to rest on a bottom surface of the spill restrictor, a first truncated portion being configured to clear any structure projecting from the bottom surface of the spill restrictor when the device rests on the bottom surface, a second truncated portion disposed opposite the first truncated portion and separated from the first truncated portion by the centrally-disposed opening such that outside edges of each of the first and second truncated portions are parallel to each other and such that remaining opposing outside edges of the plate are curved; and at least one peripherally-disposed through hole traversing the thickness of the plate, and a centrally-disposed opening configured to conform to and fit over a collar to which the drop tube and a riser pipe coupled to the underground liquid storage tank are screwed, inserting a distal end of an elongate bar through the at least one peripherally-disposed through hole and making contact with the bottom of the spill restrictor therethrough;

using the elongate bar inserted through the at least one peripherally-disposed through hole, imparting, onto the device, a first force directed in a first direction;

unscrewing the drop tube from the collar by imparting thereon a second force that is directed in an opposite direction from the first force, while the first force maintains the collar substantially immobile.

9. The method of claim 8, wherein providing is carried out with the centrally-disposed opening being shaped as a hexagon.

10. The method of claim 8, wherein providing is carried out with at least one of the first truncated portion and the second truncated portion defines a rectilinear rectangular surface.

11. The method of claim 8, wherein providing is carried out with the remaining opposing outside edges of the plate having a curvature that matches a curvature of an interior surface of the spill restrictor.

12. The method of claim 8, wherein providing is carried out with the plate further comprising a plurality of peripherally-disposed through holes, at least one of which being of a different size or shape than remaining ones of the plurality of peripherally-disposed through holes.

13. The method of claim 8, wherein providing is carried out with the at least one peripherally-disposed through hole being rectangular or square in shape.

14. The method of claim 8, wherein providing is carried out with the plate comprising metal.

* * * * *